US008720322B2

(12) United States Patent
West

(10) Patent No.: US 8,720,322 B2
(45) Date of Patent: May 13, 2014

(54) BARBEQUE SMOKER WITH HEATED REVERSE FLOW EXHAUST

(76) Inventor: Terry John West, Lexington, VA (US)

( * ) Notice: Subject to any disclaimer, the term of this patent is extended or adjusted under 35 U.S.C. 154(b) by 0 days.

(21) Appl. No.: 13/553,800

(22) Filed: Jul. 19, 2012

(65) Prior Publication Data

US 2013/0019760 A1    Jan. 24, 2013

Related U.S. Application Data

(60) Provisional application No. 61/509,285, filed on Jul. 19, 2011.

(51) Int. Cl.
A47J 37/06  (2006.01)

(52) U.S. Cl.
USPC ............. 99/340; 99/467; 99/482; 99/385; 99/401

(58) Field of Classification Search
USPC ........... 99/400, 401, 447, 446, 473, 482, 340; 126/59.5, 300, 312
See application file for complete search history.

(56) References Cited

U.S. PATENT DOCUMENTS

| 2,520,578 | A | * | 8/1950 | Treloar | 126/25 R |
| 2,626,559 | A | * | 1/1953 | Rau | 99/352 |
| 2,763,200 | A | * | 9/1956 | Kittler | 99/446 |
| 2,789,877 | A | * | 4/1957 | Pfundt | 312/312 |
| 3,223,022 | A | * | 12/1965 | Powell | 99/352 |
| 3,327,616 | A | * | 6/1967 | Ozymy | 99/339 |
| 3,971,308 | A | * | 7/1976 | Parker | 99/467 |
| 4,020,322 | A | * | 4/1977 | Muse | 219/392 |
| 4,341,198 | A | * | 7/1982 | Sullivan | 126/68 |
| 4,700,618 | A | * | 10/1987 | Cox, Jr. | 99/339 |
| 4,934,260 | A | * | 6/1990 | Blevins | 99/482 |
| 4,971,023 | A | * | 11/1990 | Martinez | 126/21 R |
| 4,979,436 | A | * | 12/1990 | McGowan | 99/340 |
| 5,078,049 | A | * | 1/1992 | Glanton | 99/482 |
| 5,203,316 | A | * | 4/1993 | Pritchett | 126/29 |
| 6,050,177 | A | * | 4/2000 | Lassig, Jr. | 99/340 |
| 6,595,197 | B1 | * | 7/2003 | Ganard | 126/25 R |
| 6,708,604 | B1 | * | 3/2004 | Deichler, Jr. | 99/482 |
| 6,810,792 | B1 | * | 11/2004 | Knight | 99/340 |
| 6,913,011 | B1 | * | 7/2005 | Snider | 126/9 R |
| 7,426,885 | B2 | * | 9/2008 | McLemore et al. | 99/482 |
| 7,681,493 | B2 | * | 3/2010 | Moore | 99/339 |
| 7,703,389 | B2 | * | 4/2010 | McLemore et al. | 99/413 |
| 2005/0155498 | A1 | * | 7/2005 | Killion | 99/482 |
| 2006/0032492 | A1 | * | 2/2006 | Bagwell et al. | 126/299 R |
| 2009/0223507 | A1 | * | 9/2009 | Bibaud et al. | 126/500 |
| 2012/0073557 | A1 | * | 3/2012 | Knight | 126/19 R |

* cited by examiner

Primary Examiner — Henry Yuen
Assistant Examiner — Lawrence Samuels
(74) Attorney, Agent, or Firm — Erickson Kernell Derusseau & Kleypas, LLC

(57) ABSTRACT

A barbeque smoker has an angled front with a heated exhaust that increases draft and air circulation, resulting in a more even heat and smoke distribution than conventional smokers. By heating an internal chimney directly over the smoker's fire, the temperature in the exhaust is higher than it is inside the cooking chamber, thus increasing draft/air circulation. The chimney intake is positioned below the cooking grates and runs on an upward angle through the cooking chamber. The chimney terminates outside the top of the smoker. This configuration forces the chamber to uniformly fill with heat and smoke before any heat or smoke can exit the cooking chamber. The increased draft aids efficient circulation of the heat and smoke, creating a very uniform cooking environment.

16 Claims, 3 Drawing Sheets

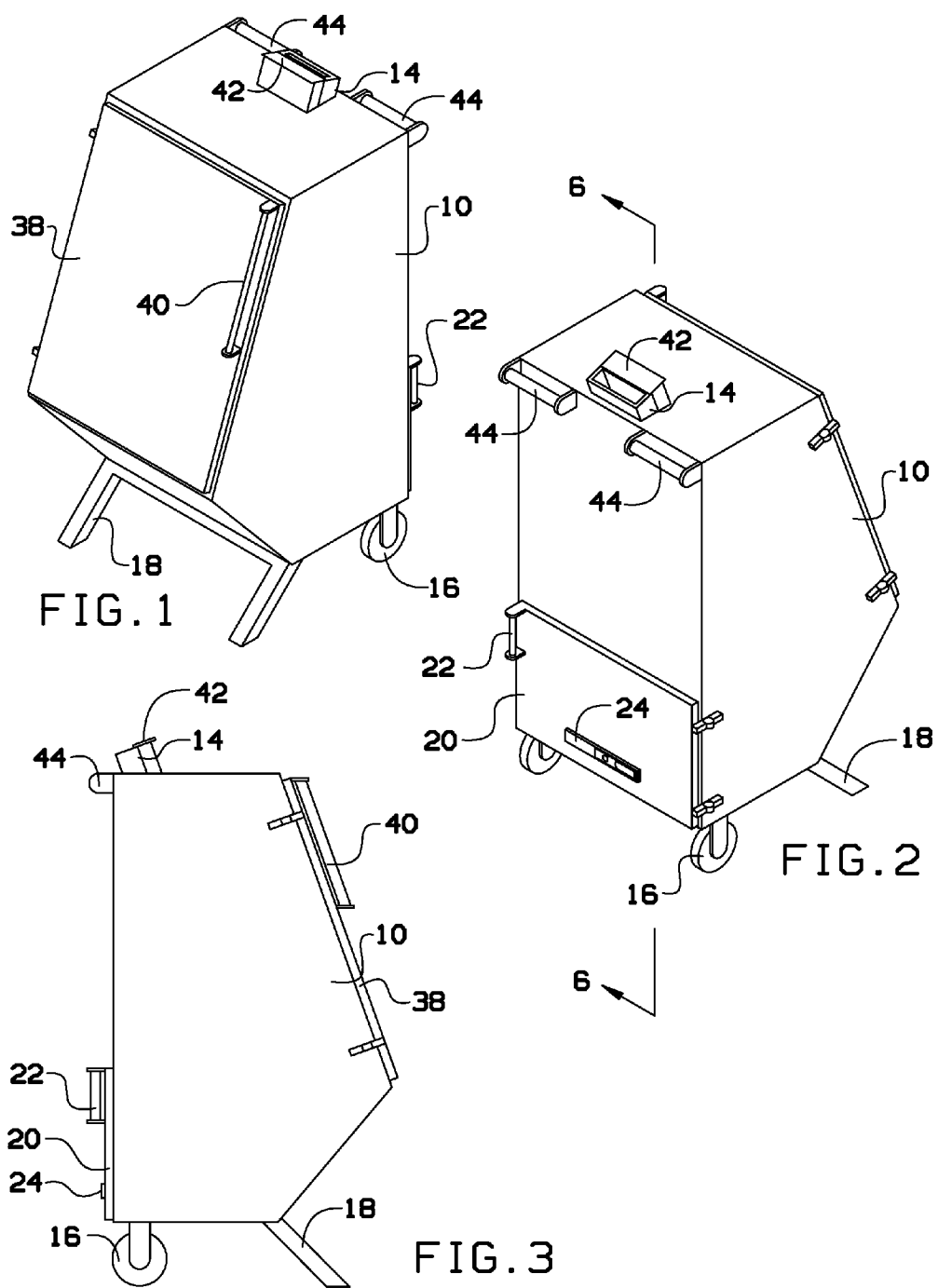

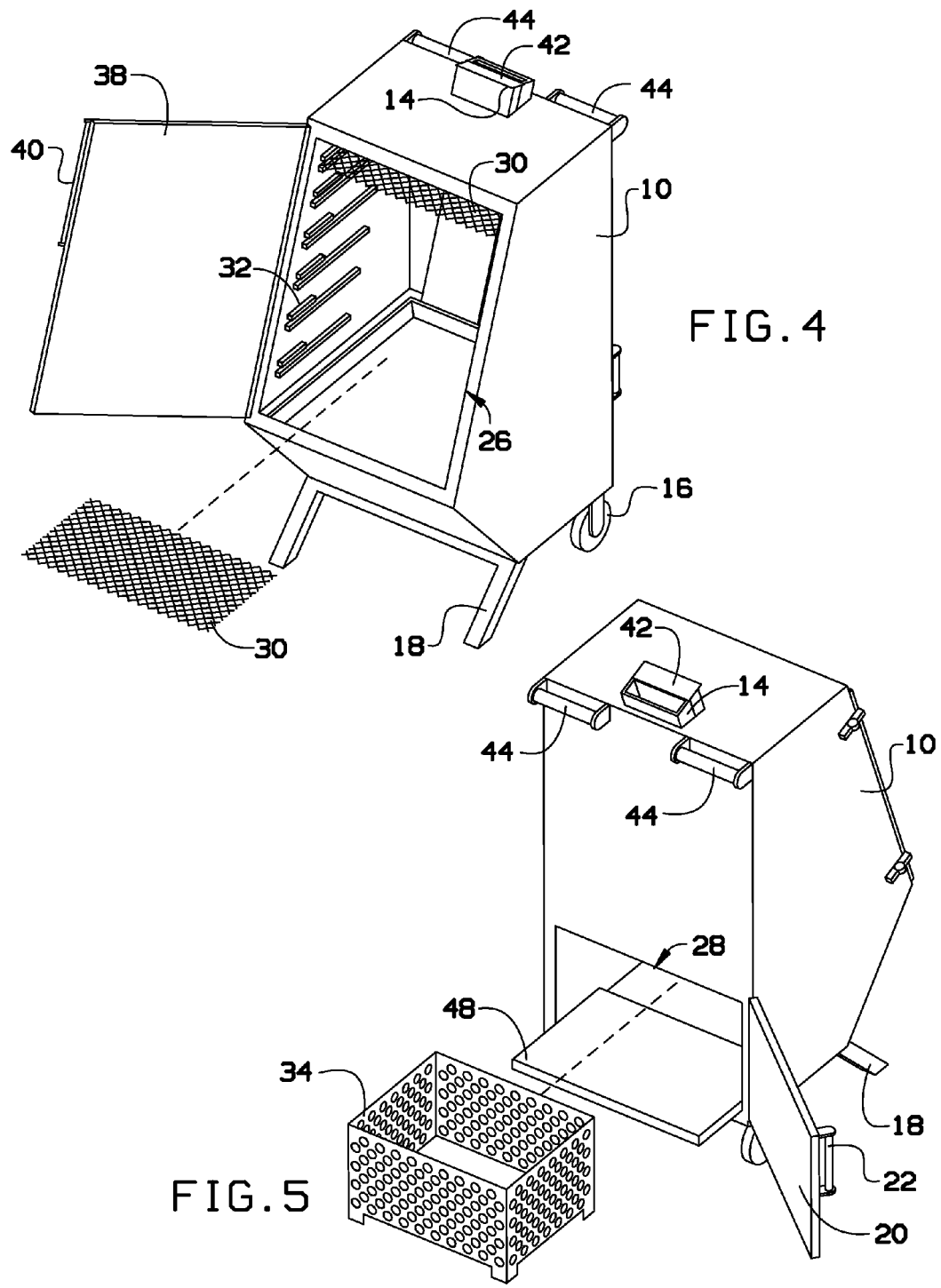

BARBEQUE SMOKER WITH HEATED REVERSE FLOW EXHAUST

CROSS-REFERENCE TO RELATED APPLICATION

This application claims the benefit of priority of U.S. provisional application No. 61/509,285, filed Jul. 19, 2011, the contents of which are herein incorporated by reference.

BACKGROUND OF THE INVENTION

The present invention relates to barbeque smokers and, more particularly, to an angled front barbeque smoker with a heated reverse flow exhaust that increases draft and air circulation.

Barbeque smokers often have uneven heat and smoke distribution throughout the cooking chamber. This can lead to hot or cold chambers within the smoker, resulting in uneven cooking. Also, uneven smoke distribution means that some items in the smoker may end up with a smokier taste than other items.

As can be seen, there is a need for a barbeque smoker that can achieve and maintain even smoke and heat distribution throughout the cooking chamber.

SUMMARY OF THE INVENTION

In one aspect of the present invention, a barbeque smoker comprises an insulated cabinet; a firebox formed in a lower portion and along a back wall of the insulated cabinet; a cooking chamber formed inside a front door on a front portion of the insulated cabinet; at least one rack disposed in the cooking chamber; an internal chimney extending from below a lowest one of the at least one rack to the top of the insulated cabinet, the internal chimney running at an angle from a central region of the inside of the insulated cabinet to a top outer edge of the insulated cabinet, wherein the internal chimney is centered on an internal wall (diffuser plate) that separates the cooking chamber from the firebox; and a diffuser plate/water pan forming a lower portion of the cooking chamber, separating the cooking chamber from the firebox.

In another aspect of the present invention, a barbeque smoker comprises an insulated cabinet; a firebox formed in a lower portion and along a back wall of the insulated cabinet; a cooking chamber formed inside a front door on a front portion of the insulated cabinet; a plurality of racks disposed in the cooking chamber; an internal chimney extending from below a lowest one of the at least one rack to the top of the insulated cabinet, the internal chimney running at an angle from a central region of the inside of the insulated cabinet to a top outer edge of the insulated cabinet, wherein the internal chimney is centered on an internal wall (diffuser plate) that separates the cooking chamber from the firebox; and a diffuser plate/water pan forming a lower portion of the cooking chamber, separating the cooking chamber from the firebox, wherein a front wall of the insulated housing of the cooking chamber is disposed at an inward angle, and the internal chimney is parallel to the insulated housing of the cooking chamber.

These and other features, aspects and advantages of the present invention will become better understood with reference to the following drawings, description and claims.

BRIEF DESCRIPTION OF THE DRAWINGS

FIG. 1 is a front perspective view of a barbeque smoker according to an exemplary embodiment of the present invention;

FIG. 2 is a back perspective view of the barbeque smoker of FIG. 1;

FIG. 3 is a side view of the barbeque smoker of FIG. 1;

FIG. 4 is a front perspective view of the barbeque smoker of FIG. 1 with its forward door opened and several racks removed for clarity;

FIG. 5 is a rear exploded perspective view of the barbeque smoker of FIG. 1 with its rear door open and the charcoal box removed.

DETAILED DESCRIPTION OF THE INVENTION

Figure 6:
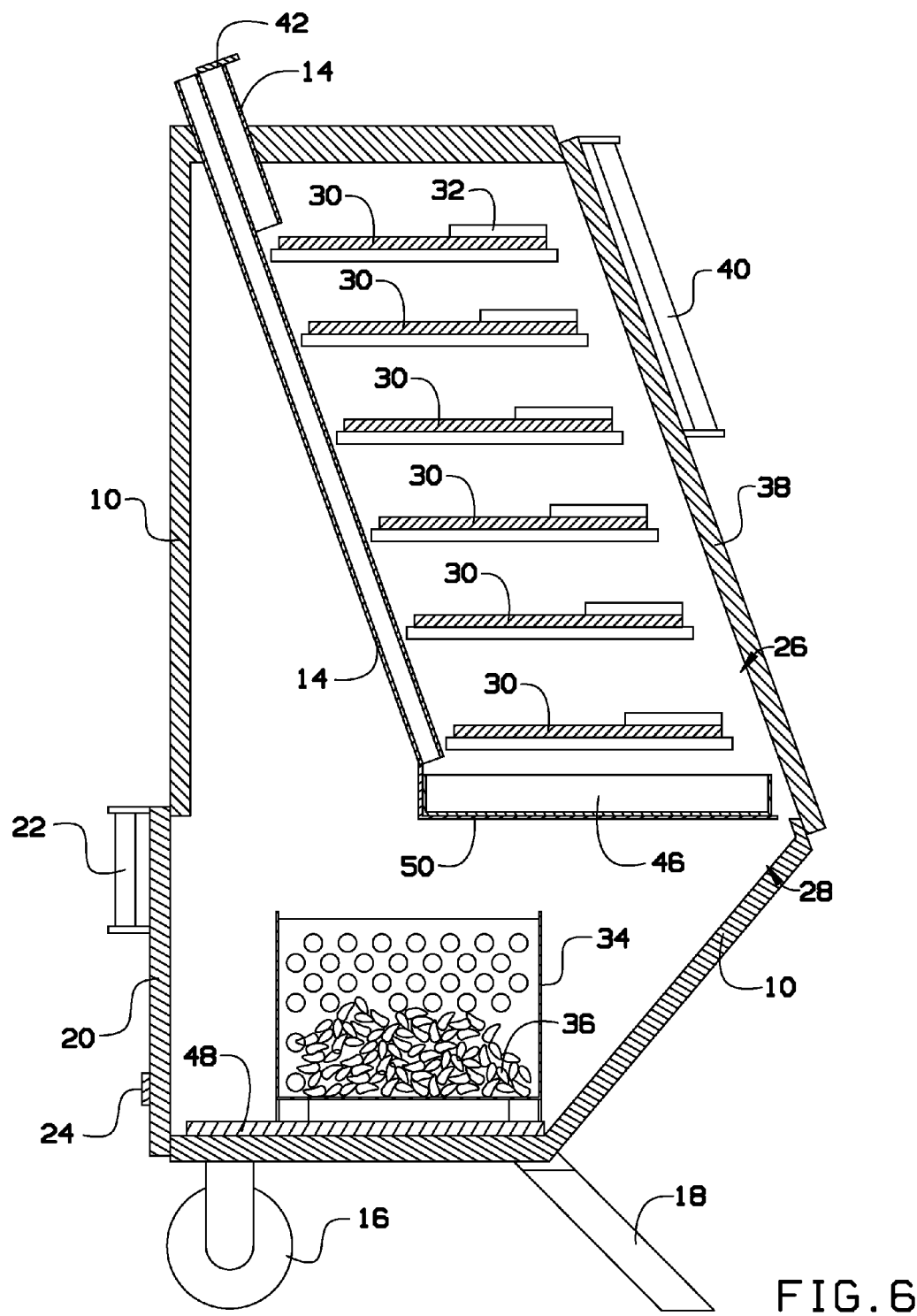
FIG. 6 is a cross-sectional view taken along line 6-6 of FIG. 2.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a barbeque smoker having an angled front with a heated exhaust that increases draft and air circulation, resulting in a more even heat and smoke distribution than conventional smokers. By heating an internal chimney directly over the smoker's fire, the temperature in the exhaust is higher than it is inside the cooking chamber, thus increasing draft/air circulation. The chimney intake is positioned below the cooking grates and runs on an upward angle through the cooking chamber. The chimney terminates outside the top of the smoker. This configuration forces the chamber to uniformly fill with heat and smoke before any heat or smoke can exit the cooking chamber. The increased draft aids efficient circulation of the heat and smoke, creating a very uniform cooking environment.

Referring now to FIGS. 1 through 6, an insulated cabinet 10 can make up the exterior housing of the smoker of the present invention. The cabinet 10 includes a cooking chamber 26 and a fire box 28.

An internal chimney 14 can extend directly over the firebox 28 on an angle and drafting from a point below the lowest one of the racks 30 disposed on a rack rail 32. The internal chimney 14 can include a second chimney that drafts from above the cooking chamber 26. A chimney cap 42 can be used to control the exhaust through the chimney 14. A diffuser plate/water pan platform 50 can be disposed, generally horizontally, above the firebox 28, with the racks 30 disposed in the cooking chamber 26 above a diffuser plate/water pan 46.

A charcoal/wood basket 34 can be disposed in the firebox 28. Charcoal, wood or the like 36 can be disposed in the charcoal/wood basket 34 inside the firebox 28. A charcoal tray 48 can be disposed below the charcoal/wood basket 34 to collect ashes.

A rear door 20 can be opened with a handle 22 to access the firebox 28. A rear door air intake 24 can be provided in a lower portion of the rear door 20. A front door 28 can be opened with a handle 40 to access the cooking chamber 26. The smoker can use a caster 16 and a leg 18 to permit easy moving and positioning of the smoker. Other mechanisms may be used on the base of the smoker to help in positioning and movement thereof.

In some embodiments, at the front of the smoker, the insulated cabinet 10 at the front of the firebox 28 can angle outward. Above the diffuser plate/water pan 46, the insulated cabinet 10 of the cooking chamber 26 can angle inward.

Typically, this angle can be between about 5 to about 30 degrees, for example. The chimney 14 can be disposed at an angle similar to the angle of the insulated cabinet 10 at the front of the cooking chamber 26 such that the chimney 14 runs generally parallel the front insulated housing 10 of the cooking chamber 26. In some embodiments, the angle of the chimney 14 can be more or less than the angle of the front insulated housing 10 of the cooking chamber 26.

In this embodiment, the firebox 28 can warm a back side of the chimney 14 before warming the cooking chamber 26, resulting in a chimney 14 that is warmer than the cooking chamber 26. In some embodiments, the chimney 14 can be up to about 30 degrees warmer than the cooking chamber 26. This can result in a better draft which increases air circulation and makes the cooking environment more uniform. With the opening for the exhaust below the level of the food in the cooking chamber 26, smoke can fill the cooking chamber 26 completely before circulating down to exit through the chimney 14.

It should be understood, of course, that the foregoing relates to exemplary embodiments of the invention and that modifications may be made without departing from the spirit and scope of the invention as set forth in the following claims.

What is claimed is:

1. A barbeque smoker comprising:
    an insulated cabinet;
    a firebox formed in a lower portion and along a back wall of the insulated cabinet;
    a cooking chamber formed inside a front door on a front portion of the insulated cabinet;
    at least one rack disposed in the cooking chamber;
    an internal chimney having an inlet and an outlet and extending upwardly and at an angle with respect to and offset from said back wall and over said firebox, at least part of said internal chimney located within said cooking chamber, said internal chimney inlet located within said cooking chamber and in spaced relation to said insulated cabinet, said internal chimney inlet positioned below said at least one rack in the cooking chamber, wherein said internal chimney is heated by said firebox, wherein smoke and heated air from said firebox enters said cooking chamber and wherein said smoke and heated air circulates about said cooking chamber and downwardly within said cooking chamber to said internal chimney inlet, wherein said smoke and heated air enters said internal chimney inlet and is conveyed through said internal chimney to said internal chimney outlet; and
    a diffuser plate/water pan platform forming a lower portion of the cooking chamber, separating the cooking chamber from the firebox.

2. The barbeque smoker of claim 1, further comprising a plurality of racks retained by a plurality of rack rails disposed in the cooking chamber.

3. The barbeque smoker of claim 1, further comprising a charcoal box disposed in the firebox.

4. The barbeque smoker of claim 3, further comprising a charcoal tray disposed under the charcoal box.

5. The barbeque smoker of claim 1, wherein a front wall of the insulated cabinet is disposed at an inward angle.

6. The barbeque smoker of claim 5, wherein the internal chimney is parallel to said front wall of the insulated cabinet.

7. The barbeque smoker of claim 1, further comprising a chimney cap disposed on an exterior end of the chimney.

8. The barbeque smoker of claim 1, further comprising a rear door adapted to permit access to the firebox.

9. The barbeque smoker of claim 8, further comprising an air vent disposed in the rear door.

10. The barbeque smoker of claim 1, further comprising a front door adapted to permit access to the cooking chamber.

11. A barbeque smoker comprising:
    an insulated cabinet;
    a firebox formed in a lower portion and along a back wall of the insulated cabinet;
    a cooking chamber formed inside a front door on a front portion of the insulated cabinet
    a plurality of racks disposed in the cooking chamber;
    an internal chimney having an inlet and an outlet, said internal chimney extending at an upward angle offset from and toward said back wall and directly over said firebox such that said internal chimney is heated by said firebox, said internal chimney inlet located within said cooking chamber in spaced relation to said insulated cabinet, said internal chimney inlet located below said plurality of racks and said internal chimney extending from said inlet through at least part of said cooking chamber at a location behind said plurality of racks, said internal chimney for exhausting smoke from said cooking chamber after the smoke has, moved about said cooking chamber and circulated downward toward said inlet; and
    a diffuser plate/water pan forming a lower portion of the cooking chamber, separating the cooking chamber from the firebox, wherein
        a front wall of the insulated cabinet is disposed at an inward angle, and
        the internal chimney is parallel to said front wall of the insulated cabinet.

12. The apparatus as in claim 11 wherein the temperature within said chimney is higher than the temperature within said cooking chamber.

13. The apparatus as in claim 11 further comprising a diffuser below said cooking chamber.

14. The apparatus as in claim 11 wherein said cabinet has a sloped front.

15. The apparatus as in claim 11 wherein said cabinet is insulated.

16. The apparatus as in claim 11 further comprising a second chimney, said second chimney located completely above at least one rack of said plurality of racks.

* * * * *